United States Patent
Villavicencio et al.

(10) Patent No.: US 11,550,905 B2
(45) Date of Patent: Jan. 10, 2023

(54) INTELLIGENT SECURITY RISK ASSESSMENT

(71) Applicant: ADP, Inc., Roseland, NJ (US)

(72) Inventors: Francisco Villavicencio, Tenafly, NJ (US); Juan M. Andrade, Morristown, NJ (US)

(73) Assignee: ADP, Inc, Roseland, NJ (US)

( * ) Notice: Subject to any disclaimer, the term of this patent is extended or adjusted under 35 U.S.C. 154(b) by 980 days.

(21) Appl. No.: 15/935,091

(22) Filed: Mar. 26, 2018

(65) Prior Publication Data
US 2019/0294786 A1    Sep. 26, 2019

(51) Int. Cl.
| G06F 21/55 | (2013.01) |
| G06N 3/08 | (2006.01) |
| G06N 7/00 | (2006.01) |
| G06Q 20/40 | (2012.01) |

(52) U.S. Cl.
CPC ............ *G06F 21/554* (2013.01); *G06N 3/08* (2013.01); *G06N 7/005* (2013.01); *G06Q 20/4016* (2013.01); *G06F 2221/034* (2013.01)

(58) Field of Classification Search
CPC ......... G06F 21/554; G06N 3/08; G06N 7/005
See application file for complete search history.

(56) References Cited

U.S. PATENT DOCUMENTS

| 7,246,740 | B2 | 7/2007 | Swift et al. |
| 8,065,233 | B2 | 11/2011 | Lee et al. |
| 2004/0225627 | A1 | 11/2004 | Botros et al. |
| 2007/0294195 | A1 | 12/2007 | Curry et al. |
| 2015/0073981 | A1 | 3/2015 | Adjaoute |
| 2016/0071017 | A1 | 3/2016 | Adjaoute |
| 2016/0078532 | A1 | 3/2016 | Bartlett et al. |

FOREIGN PATENT DOCUMENTS

| EP | 1821250 A1 | 8/2007 |
| WO | 2007047871 A2 | 4/2007 |
| WO | 2015103693 A1 | 7/2015 |
| WO | WO 2016/050990 A1 * | 4/2016 ............ H04L 29/06 |

OTHER PUBLICATIONS

International Search Report dated Jun. 14, 2019 regarding Intl. Application No. PCT/US2019/023599; 4 pages.
Written Opinion dated Jun. 14, 2019 regarding Intl. Application No. PCT/US2019/023599; 4 pages.
European Office Action dated Mar. 24, 2022, regarding EP Application No. 19716043.5; 8 pages.

\* cited by examiner

*Primary Examiner* — Beemnet W Dada
(74) *Attorney, Agent, or Firm* — Yee & Associates, P.C.

(57) ABSTRACT

A method, computer system, and computer program product for on-demand risk assessment in on-line transactions comprises: computing, by a machine intelligence application, a risk score for the individual; providing the risk score to a cache; and responsive to receiving new data regarding the individual, calculating a new risk score for the individual and replacing the risk score in the cache with the new score.

20 Claims, 8 Drawing Sheets

INTELLIGENT SECURITY RISK ASSESSMENT

BACKGROUND INFORMATION

1. Field

The present disclosure relates generally to an improved computer system for on-line transaction security and, in particular, to a method and apparatus for providing a real-time intelligent security risk assessment for an individual engaged in processing an on-line transaction.

2. Background

Companies that provide on-line transactions must have security applications to ensure that persons accessing a website to engage in transactions are indeed the person they purport to be, and to prevent unauthorized access to the company's computers by persons or entities engaged in criminal activity.

One component of on-line transaction security is assessing the risk of a potential user who is attempting to log in and engage in transactions. Currently, such risk assessment is conducted using human-defined policies and rules. A problem exists in that human-defined policies and rules eventually become inadequate and obsolete. The speed at which such obsolescence takes place increases along with the speed and capability of computers available to those seeking to hack, spoof, and/or damage the systems.

Therefore, it would be desirable to have a method and apparatus that take into account at least some of the issues discussed above, as well as other possible issues. For example, it would be desirable to have a method and apparatus that overcome a technical problem with an on-demand real-time risk assessment.

SUMMARY

An embodiment of the present disclosure provides a computer-implemented method. The computer-implemented method, responsive to receiving a message, calculates, by a machine intelligence application running on a processor unit, a risk score for an individual. The computer-implemented method provides, by the machine intelligence application running on the processor unit, the risk score to a cache. The message is triggered by an event regarding the individual in an external or an internal database and is associated with new data regarding the individual.

Another embodiment of the present disclosure provides a computer system comprising a processor unit, a data ingestion and orchestration application running on the processor unit. Internal data sources are connected to the data ingestion and orchestration application, and the internal data sources are configured to send a first message associated with an internal data item, responsive to a first triggering event, to the processor unit. The external data sources are connected to the data ingestion and orchestration framework, and the external sources are configured to send a second message associated with an external data item, responsive to a second triggering event, to the processor unit. The normalizer, running on the processor, forms normalized data from the internal data item and the external data item. A machine intelligence application having algorithms is configured to receive the normalized data and to compute a risk score for an individual using the normalized data.

Another embodiment of the present disclosure provides a computer program product for real time risk assessment. The computer program product comprises computer-readable instructions configured to cause a processor to request a risk score for an individual, computer-readable instructions configured to cause a processor, responsive to receiving a request for a risk score, to access a cache, computer-readable instructions configured to cause a processor, responsive to accessing the cache, identify a risk score for the individual, and computer-readable instructions configured to cause a processor, responsive to identifying the risk score for the individual, to determine whether to grant or deny access to the on-line transaction based on the risk score.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
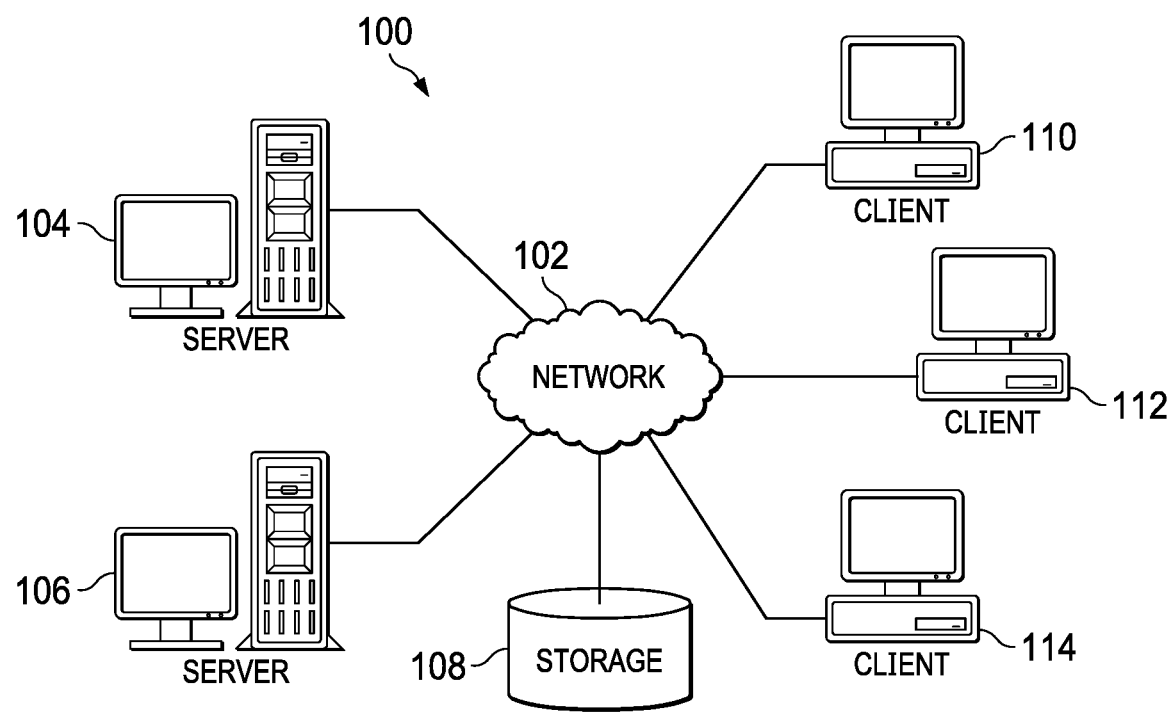
FIG. 1 is an illustration of a network data processing environment in accordance with an illustrative embodiment.

The illustrative embodiments recognize and take into account one or more different considerations. For example, the illustrative embodiments recognize and take into account that there are many types of patterns and anomalies in the behavior of persons involved in on-line transactions that may be learned in order to detect fraud or unlawful interception of digital signals. For example, an individual employee may typically log-in from her office. Log-in and authentication data may show one or more failed authentication attempts from an internet provider in another country.

Moreover, after a successful login, the very next transaction for that employee may be a change to her direct deposit account a few days before her pay cycle. In another illustrative example, a system may take into account that an admin user has started to download sensitive data from a human capital management (HCM) application at odd hours. In another illustrative example, a user who has never interacted with his 401K may suddenly start to withdraw funds. In another illustrative example, a fraud analyst may access a system to understand the learned behavior of a particular user suspected to be involved in fraud.

In each of the foregoing examples, it would be desirable to challenge the user with increasingly stronger methods of security to ensure that fraud is not involved. However, before the user can be challenged, the behavior must be identified as departing from the normal user behavior. In order for a machine to know a user's normal behavior, the user's behavioral patterns must be learned. Once the user's behavioral patterns have been learned, anomalies can be identified.

The illustrative embodiments recognize and take into account that the foregoing behaviors represent patterns and anomalies that may be detected by machine intelligence using machine learning algorithms, such as Bayesian networks and neural networks optimized for pattern recognition. The illustrative embodiments recognize and take into account that data may be normalized for consumption by a machine learning algorithm, and that to optimize data ingestion, redundant or equivalent inputs may be "reduced" or combined by a program, such as a MapReduce cluster, for example. In order to simplify data acquisition and ingestion, data input may be categorized into simpler and fewer variables. Furthermore, records with no relevant event data may be discarded.

The illustrative embodiments recognize and take into account that a risk score may be provided in much of the same manner as a credit score is provided for decision making in lending transactions. For example, if an individual's credit score is below a certain threshold, the individual may be denied a loan or credit. A credit score is an estimate of the probability that an individual may default on repayment of a loan or credit. In a similar manner, a risk score may be a normalization of the probability of the anomalies detected by a machine learning algorithm in regard to a user's behavior in on-line transactions. For example, risk may be categorized in a scale. In an illustrative example, scales may be from 0-100, 0-1000, or negative 1000 to positive 1000. Scales may be designed for customer ease of use. In most embodiments, the larger the value on the scale, the greater the potential risk that the transaction may be indicated to be fraudulent.

The risk score may reflect the composition of multiple patterns detected by machine learning algorithms. For example, when the machine learning algorithms identify that a user logs in from a place considered to be risky, the machine learning algorithms may also look at other conditions that could lead to fraud. An example of such other conditions may be a change to the direct deposit account in the example above. If those conditions are matched, an alarm may be triggered and sent to subscriber applications or if an application is using a risk assessment application service, a high risk score will be reported by the service. The application may deny the transaction or use a service to challenge the user for additional authentication before allowing the operation to be executed. Moreover, a machine intelligence application may employ machine learning algorithms not only to improve speed and performance, but also to make forward looking decisions to prevent fraud in online transactions. Thus the illustrative embodiments recognize and take into account that machine intelligence applications may be employed not only to learn from past events to improve performance, but also to apply what has been learned to prevent fraud in on-line transactions. Thus a machine intelligence application running on a processor that has learned from prior operations is in effect like an experienced human employee with many years of service in comparison to a newly hired employee without experience. Both can perform as needed according to a job description. However, the veteran employee can much more readily foresee problems before they arise due his experience.

The illustrative embodiments recognize and take into account that a risk assessment application may want to get assurance that a particular transaction is being requested by the rightful user and not from an attacker who was able to hijack the user's session. The risk assessment application may use a risk assessment application service to get an assurance assessment. The risk assessment application may use the risk assessment application to submit the application's event to the system where it may go through risk assessment algorithms. The risk assessment algorithms may compute a risk score and return the score as a response of the risk assessment application. If the risk score is high, the risk assessment application may challenge the user for additional authentication.

After a successful challenge, the user's profile may be enriched with this input. In other words, the system will learn and take into account this new data. The system may cache the fact that the user was challenged successfully and factor in this information in subsequent requests from the same user to improve the usability. The illustrative embodiments recognize and take into account that an administrator executing multiple similar transactions may have a productivity loss if the user is challenged for every transaction, and therefore, the system may determine whether a transaction is a critical transaction before calling the risk assessment application.

The illustrative embodiments recognize and take into account that a combination of data sources may be used to build a risk assessment model that can learn, detect, and predict potential fraud or risky transactions by taking into account individual profiles learned from the user's behavior and collected holistic data points such that risk assessments can be done in real-time to provide immediate feedback to applications using the system.

The illustrative embodiments recognize and take into account that existing technologies and data sources may be used in a new way where the focus is on rapid ingestion of diverse data. The ingested data may be used for risk computation that is made available to any calling application from a risk assessment application in near real-time. In an illustrative embodiment, data ingestion, normalization, learning, data caching, and risk scoring algorithms may be combined in such a way that the service can be provided in real-time.

The illustrative embodiments recognize and take into account that holistic and individualized profiles of users may be constructed into a system that captures and normalizes identity quality, device, and behavior. By way of example, such profiles may provide data regarding applications visited, pages visited, transactions conducted, and patterns accessed from different data sources.

The illustrative embodiments recognize and take into account that the system may be continuously enriched using machine learning techniques with new data learned about the users, that the system may be consulted in real-time with new data to get an assessment of the assurance of the identity of users during registration, authentication and execution of sensitive transactions to prevent fraud.

The illustrative embodiments recognize and take into account that the system may provide alerts of patterns and anomalies detected in user's behaviors. For example, a same device used by multiple users, a same identity data used in multiple user accounts, and multiple bank account changes within a particular group of users may trigger an alert. The illustrative embodiments recognize and take into account that the system may be consulted to trace the activities of a user or group of users in near real-time. The illustrative embodiments recognize and take into account that the system may use a risk model to qualify the assurance of the identity of users in the execution of sensitive transactions. Alerts may be provided by messages associated with new internal or external data regarding an individual.

Thus, the illustrative embodiments provide a method, apparatus, and computer program product for a computer-implemented method for on-demand risk assessment in on-line transactions. The computer-implemented method comprises computing, by a machine intelligence application, a risk score for the individual. The computer-implemented method provides the risk score to a cache and responsive to receiving new data regarding the individual, calculates a new risk score for the individual and replaces the risk score in the cache with the new score.

Another embodiment of the present disclosure provides a system for assigning a risk score to an individual for an on-line transaction. The system comprises a number of external data sources connected to a cloud reactor, with the cloud reactor connected to a data ingestion framework. A number of internal data sources are connected to the data ingestion framework. A number of external data sources are connected to the data ingestion framework. Machine intelligence is connected to the data ingestion framework. The machine intelligence is configured to receive normalized data and to compute a risk score for an individual using the normalized data.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computer 110, client computer 112, and client computer 114 connect to network 102. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
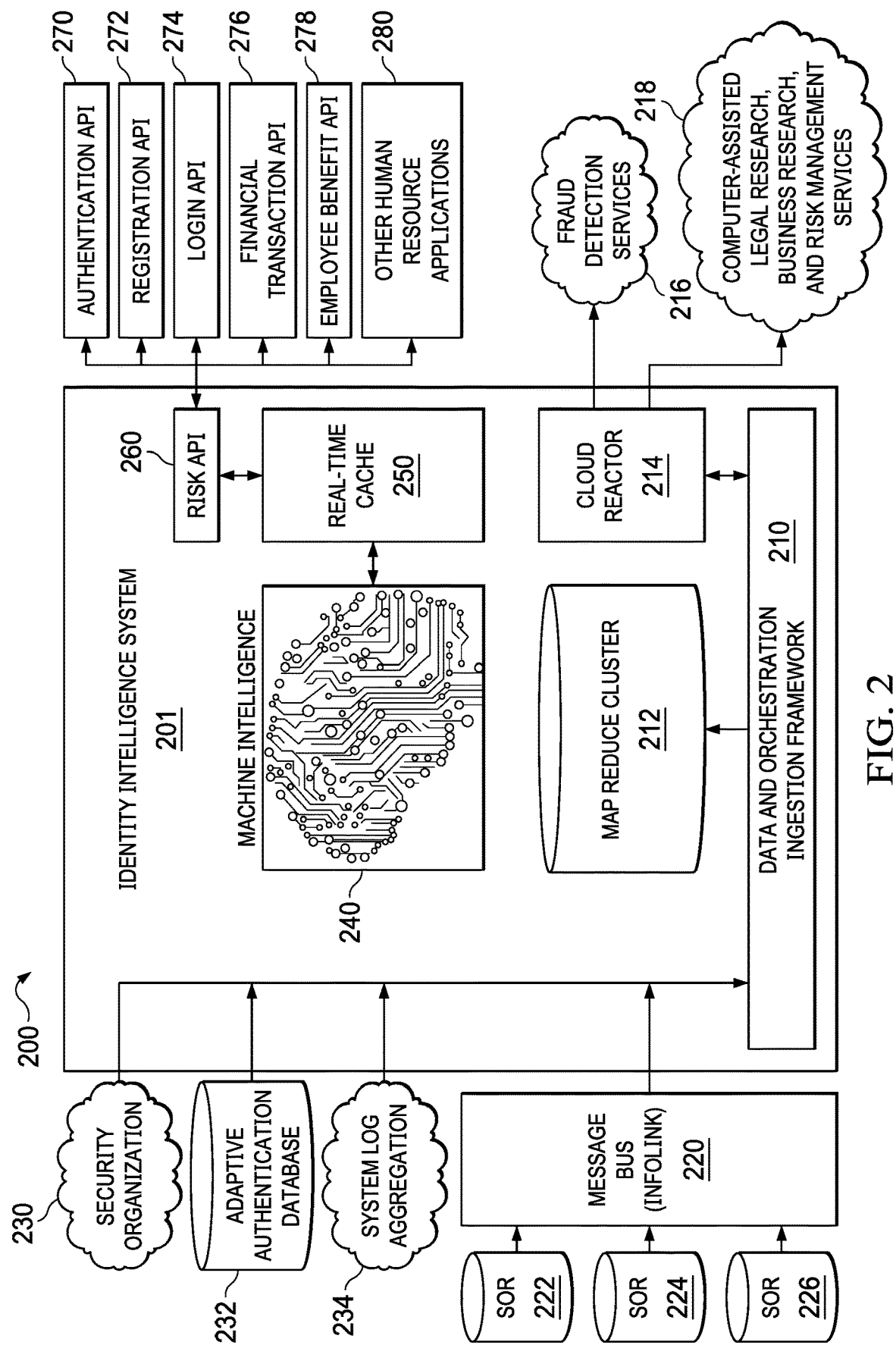
FIG. 2 is an illustration of a block diagram of an identity intelligence system in accordance with an illustrative embodiment.

Turning now to FIG. 2, an illustration of a block diagram of an identity intelligence system is depicted in accordance with an illustrative embodiment. Intelligent security risk assessment 200 comprises identity intelligence system 201. Identity intelligence system 201 may reside in server computer 104 or server computer 106 in FIG. 1. Alternatively, portions of identity intelligence system 201 may reside on one or more of server computer 104, server computer 106, client computer 110, client computer 112, client computer 114 and storage unit 108 in FIG. 1. Identity intelligence system 201 may comprise data and orchestration ingestion framework 210, map reduce cluster 212, cloud reactor 214, machine intelligence 240, risk API 260, and real-time cache 250. Machine intelligence 240 may be implemented using one or more systems such as an artificial intelligence system, neural networks, a Bayesian network, an expert system, a fuzzy logic system, a genetic algorithm, or other suitable types of systems.

Identity intelligence system 201 is connected to message bus 220 and to a number of databases and services. Message bus 220 links identity intelligence system 201 to a number of Sources of Records (SOR) databases such as SOR 222, SOR 224, and SOR 226. Identity intelligence system 201 may be connected to security organization 230, adaptive authentication database 232, and system log aggregation 234. The ingestion framework may be a high-performance data ingestion framework that may be implemented using an application having a MapReduce cluster that can analyze and sort through a vast set of data points. Sources for this data will be both internal, including logs from authentication and registration components typically aggregated in system log aggregation 234, audit data aggregated in security organization 230, and events triggered by SORs such as SOR 222, SOR 224, and SOR 226; as well as external, such as risk scores or fraud indicators about individuals coming from providers such as fraud detection services 216 and computer-assisted legal research, business research, and risk management services 218. Fraud detection services 216 may be an external fraud detection service available online. This data, once normalized, ingested, and processed, will allow machine intelligence 240 to learn. Machine intelligence 240 may learn patterns, detect anomalies and assess risks associated to individual identities. In one illustrative example, machine intelligence 240 may be implemented using an open source machine learning software. In an illustrative example, an open source machine learning software may be Google's TensorFlow®, which is available from Google, LLC.

Identity intelligence system 201 may compute the security risk associated to a given individual at the current point in time. The risk assessment application may be a service that allows various services, such as authentication API 270, registration API 272, login API 274, and financial transaction API 276, employee benefit API 278, and other human resource applications 280 that may need to consider risk and to call risk API 260 to get the most recent risk score associated with a given individual. A given individual may be identified deterministically via unique identifiers that may be used to map and identify a person in a system, such as intelligent security risk assessment 200. The unique identifiers may serve a purpose similar to email addresses, cell phone numbers, social security numbers, and national government identification numbers. Since risk API 260 may be in the critical path of mission-critical transactions such as authentication API 270 and registration API 272 it may leverage real-time cache 250 so that it can scale and respond without adding delays to risk API 260. Identity intelligence system 201 may provide an oracle of individual risk, constantly assessing, adjusting and learning from inputs, and reflecting this learning in an updated risk score.

By design, risk scores will trend up and down and may otherwise change over time for any given person. One category of changes may be event driven changes. When a person's risk score changes, identity intelligence system 201 may push a notification out via a message associated with new data regarding an individual communicating such a change, and applications that subscribe to these messages may then take whatever proactive action they deem reasonable. Identity intelligence system 201 may provide proactive anomaly detection at an aggregate level, such as when a group of individuals' risk scores change in a similar and correlated manner within a reasonable time frame such as within hours or days of each other, and the individuals have a significant common characteristic, such as a same geographical location, or a same client organization so that identity intelligence system 201 can alert security organization 230 or other security operation teams on what may seem to be a targeted attack.

Identity intelligence system 201 improves risk assessment for a person requesting to complete one or more transactions. For example, authentication of a person may be made more quickly, more accurately, or both more quickly and more accurately using identity intelligence system 201. In many cases, real-time risk assessment is desired when processing transactions. Authenticating a person is a process that determines whether the person is who the person says they are in this illustrative example.

Figure 3:
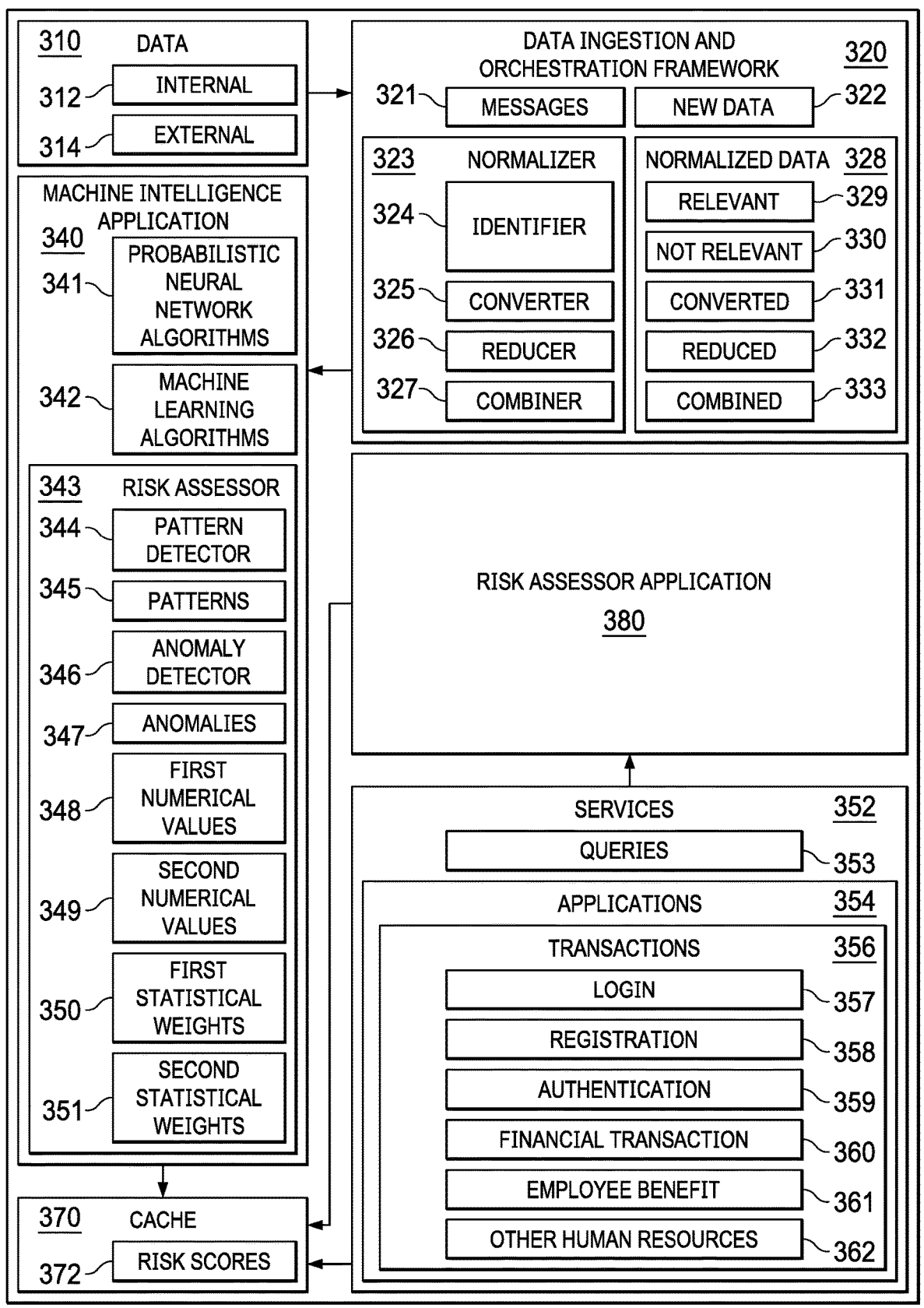
FIG. 3 is an illustration of a data flow in an embodiment of the identity intelligence system in accordance with an illustrative embodiment.

Turning now to FIG. 3 is an illustration of a block diagram of a data flow in accordance with an illustrative embodiment. Computer system 300 may assign a risk score to an individual and comprises data 310, data ingestion and orchestration framework 320, machine intelligence application 340, services 352, and cache 370. Data may include internal data 312 and external data 314.

Internal data 312 may be data such as SOR 222, SOR 224, and SOR 226 connected through message bus 220 to identity intelligence system 201 in FIG. 2. Internal data 312 may be data such as data from security organization 230, adaptive authentication database 232, and system log aggregation 234 in FIG. 2. Internal data 312 may comprise one or more of the following: audit data logs, lifecycle changes, changes in individual information, credit history information, social network data, social network activity data, role changes, device registration, financial data, changes in account numbers, changes in credit card numbers or data, employment data including employment status and history, authentication data, transactions, screen navigation, screen visitations, system data and application logs.

External data 314 may be data from fraud detection services 216 and computer-assisted legal research, business research, and risk management services 218 connected through cloud reactor 214 in FIG. 2. External data 314 may comprise public records used to validate input data provided by other applications, flag data, fraud detection service provided data known to be associated with fraud including IP addresses, mobile devices numbers, email addresses, and mailing addresses.

Machine intelligence application 340 may be connected to data ingestion and orchestration framework 320 and cache 370. Machine intelligence application 340 may comprise probabilistic neural network algorithms 341, machine learning algorithms 342, and risk assessor 343. Risk assessor 343 may comprise pattern detector 344, patterns 345, anomaly detector 346, and anomalies 347. Risk assessor 343 may further comprise first numerical values 348, second numerical values 349, first statistical weights 350, and second statistical weights 351.

Machine intelligence application 340 may be configured to receive normalized data 328 from data ingestion and orchestration framework 320 and to compute risk scores 372 for individuals using normalized data 328. In an embodiment, machine intelligence application 340 receives normalized data 328 from data ingestion and orchestration framework 320, and responsive to receiving normalized data 328 detects patterns 345 and anomalies 347 of each individual whose data has been ingested by data ingestion and orchestration framework 320. Machine intelligence application 340 continually updates risk scores 372 in cache 370 as new normalized data 328 is processed by data ingestion and orchestration framework 320.

Data ingestion and orchestration framework 320 may comprise normalizer 323 and normalized data 328. Normalizer 323 comprises identifier 324, converter 325, reducer 326, and combiner 327. Normalized data 328 may comprise relevant data 329, not relevant data 330, converted data 331, reduced data 332, and combined data 333.

Cache 370 may be connected to the machine intelligence application 340. Cache 370 may store risk scores 372.

Services 363 may comprise applications from business entities that subscribe to and utilize risk scores from machine intelligence application 340. Services may send queries 353 to machine intelligence application 340. Queries 353 may come from transactions 356. Applications 354 may be one of authentication API 270, registration API 272, login API 274, financial transaction API 276, employee benefit API 278, and other human resource applications 280 in FIG. 2. Transactions 356 may be login transaction 357, registration transaction 358, authentication transaction 359, financial transaction 360, employee benefit transaction 361, and other human resources transactions 362.

Risk assessor application 380 may receive queries from services and, responsive to a query, retrieve risk scores from risk scores 372 in cache 370. Cache 370 may be configured to provide rapid access by risk assessor application 380 in responding to queries 353 from services 352. In a like manner, cache 370 may be configured to provide rapid access by risk API 260 in FIG. 2.

In one illustrative example, one or more technical solutions are present that overcome a technical problem with an on-demand real-time risk assessment. One technical problem is that there are many types of patterns and anomalies in the behavior of persons involved in on-line transactions that may be learned in order to detect fraud or unlawful interception of digital signals. However, the vast amount of data is not currently accessible on a real-time basis. Indeed, the data is limited by the speed at which humans can identify a single data point. As a result, one or more technical solutions may provide a technical effect by processing data faster using machine intelligence configured to detect patterns in on-line behavior and detect anomalies in those patterns. Moreover, the machine intelligence can learn from the behavior and thus not only provide a result, such as risk score faster, but use less resources, both human and machine, to provide the risk score.

Thus, one or more technical solutions result in improvements in risk assessment. For example, one or more illustrative examples may provide increased accuracy and increased speed in authenticating a person. Improvement in risk assessment provided by one or more technical solutions results in increased security in processing transactions in a computer system. The increased security may be provided while providing a desired response time in processing transactions. For example, the risk assessment can be performed in real-time using one or more technical solutions in the illustrative examples, such as storing risk scores 372 in cache 370. Moreover, increased accuracy may be obtained by virtue of the internal and external data that is ingested by data ingestion and orchestration framework 320 and processed by machine intelligence application 340.

As a result, computer system 300 operates as a special purpose computer system in which data ingestion and orchestration framework 320 and machine intelligence application 340 in computer system 300 enables normalized data 328 to be processed by machine intelligence and to detect patterns and anomalies of each individual's data that is ingested. In particular, machine intelligence application 340 transforms computer system 300 into a special purpose computer system as compared to currently available general computer systems that do not have machine intelligence application 340 with probabilistic neural network algorithms 341, machine learning algorithms 342, and risk assessor 343 that when running on a processor can create first numerical values 348, second numerical values 349, first statistical weights 350, and second statistical weights 351 to calculate risk scores 372.

Figure 4:
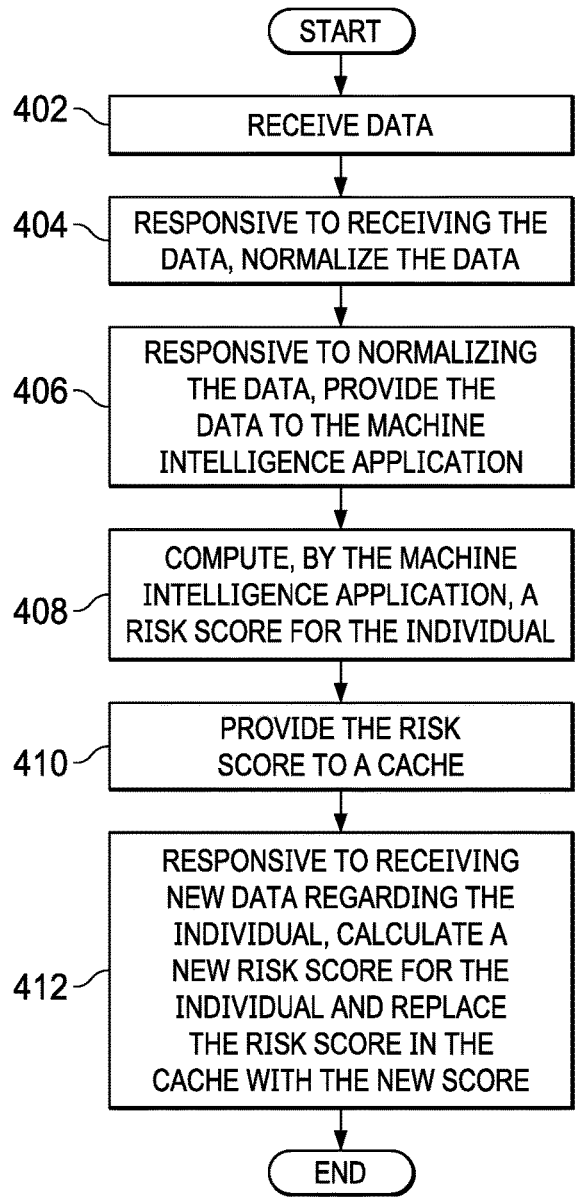
FIG. 4 is an illustration of a flowchart of a process for acquiring data for the identity intelligence system in accordance with an illustrative embodiment.

Turning now to FIG. 4 is an illustration of a flowchart of a process for acquiring data for the identity intelligence system in accordance with an illustrative embodiment. Process 400 can be implemented in software, hardware, or combination of the two. When software is used, the software comprises program code that can be loaded from a storage device and run by a processor unit in a computer system such as computer system 300 in FIG. 3. Computer system 300 may reside in a network data processing system such as network data processing system 100 in FIG. 1. For example, computer system 300 may reside on one or more of server computer 104, server computer 106, client computer 110, client computer 112, and client computer 114 connected by network 102 in FIG. 1.

Process 400 starts and receives data (step 402). Responsive to receiving the data, the data is normalized (step 404). The data may be new data 322 associated with a message from messages 321 forwarded by data ingestion and orchestration framework 320 in FIG. 3. The data may be normalized by normalizer 323 of data ingestion and orchestration framework 320 in FIG. 3. The data may comprise one or both of internal data 312 and external data 314 in FIG. 3. Normalizing the data may comprise identifying from the new data by identifier 324 relevant data 329, identifying from the new data by identifier 324 not relevant data 330, and forming converted data 331 by converter 325, forming reduced data 332 by reducer 326, and forming combined data 333 by combiner 327 in data ingestion and orchestration framework 320 in FIG. 3.

Responsive to normalizing the data, the process provides the data to the machine intelligence application (step 406).

The machine intelligence may be machine intelligence application 340 in FIG. 3. Machine intelligence application 340 may employ machine intelligence, such as machine intelligence 240 in FIG. 2.

A risk score is computed by the machine intelligence application (step 408). The risk score may be computed by machine intelligence application 340 in FIG. 3. The risk score is provided to a cache (step 410). The risk score may be stored in risk scores 372 in cache 370 in FIG. 3. Responsive to receiving new data regarding the individual, the machine intelligence application calculates a new risk score for the individual and replaces the risk score in the cache with the new risk score (step 412). The process terminates thereafter. In the foregoing manner, an up-to-date risk score is always available to requestors in the cache.

Figure 5:
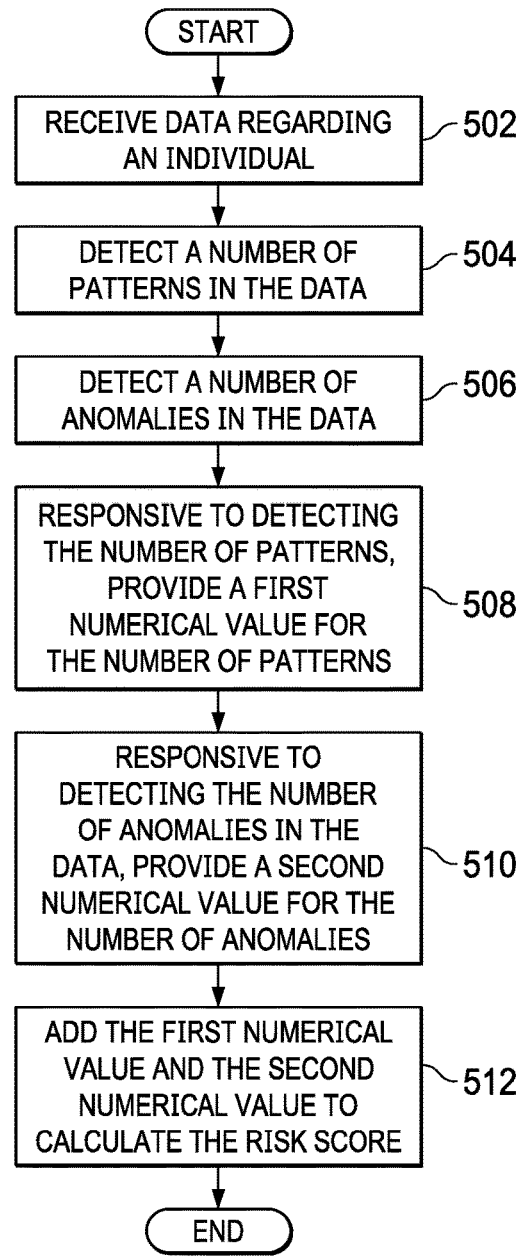
FIG. 5 is an illustration of a flowchart for computing a risk score for an individual in accordance with an illustrative embodiment.

Turning now to FIG. 5, an illustration of a flow chart for computing a risk score for an individual is depicted in accordance with an illustrative embodiment. Process 500 can be implemented in software, hardware or combination of the two. When software is used, the software comprises program code that can be loaded from a storage device and run by a processor unit in a computer system such as computer system 300 in FIG. 3. Computer system 300 may reside in a network data processing system such as network data processing system 100 in FIG. 1. For example, computer system 300 may reside on one or more of server computer 104, server computer 106, client computer 110, client computer 112, or client computer 114 connected by network 102 in FIG. 1.

Process 500 starts and receives data regarding an individual (step 502). The data may be normalized data from data ingestion and orchestration framework 320 in FIG. 3. The machine intelligence application detects a number of patterns in the data (step 504). The patterns may be patterns 345 detected using pattern detector 344 in FIG. 3.

The machine intelligence application detects a number of anomalies in the data (step 506). The anomalies may be anomalies 347 detected using anomaly detector 346 in FIG. 3. Responsive to detecting the number of patterns, the machine intelligence application provides a first numerical value for the number of patterns (step 508). The first numerical value may be one of first numerical values 348 in FIG. 3. Responsive to detecting the number of anomalies in the data, the machine intelligence application provides a second numerical value for the number of anomalies (step 510). The second numerical value may be one of second numerical values 349 in FIG. 3. The machine intelligence application adds the first numerical value and the second numerical value to calculate the risk score (step 512). Machine intelligence application 340 may employ probabilistic neural network algorithms 341 and machine learning algorithms 342 and use first statistical weights 350, and second statistical weights 351 in FIG. 3 to determine the risk score. Process 500 terminates thereafter.

Figure 6:
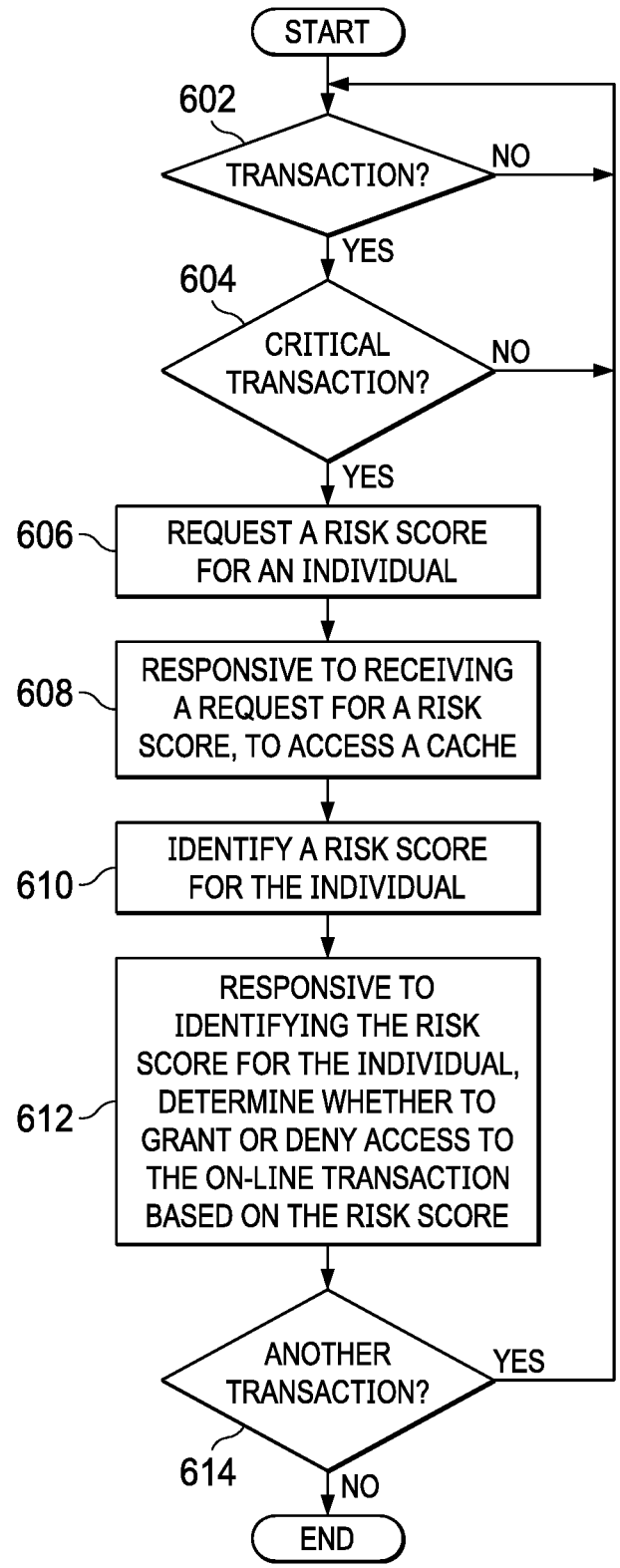
FIG. 6 is an illustration of a process for requesting a risk score for an individual in accordance with an illustrative embodiment.

FIG. 6 is an illustration of a process for requesting a risk score for an individual in accordance with an illustrative embodiment. Process 600 can be implemented in software, hardware or combination of the two. When software is used, the software comprises program code that can be loaded from a storage device and run by a processor unit in a computer system such as computer system 300 in FIG. 3. Computer system 300 may reside in a network data processing system such as network data processing system 100 in FIG. 1. For example, computer system 300 may reside on one or more of server computer 104, server computer 106, client computer 110, client computer 112, or client computer 114 connected by network 102 in FIG. 1.

Process 600 starts and a determination is made whether a transaction is underway (step 602). If there is not a transaction underway, the process returns to step 602. The determination may be made by risk assessor application 380 in FIG. 3. A transaction may be a transaction from transactions 356 in FIG. 3. Responsive to determining that a transaction is underway, a determination is made whether the transaction is a critical transaction (step 604). If the transaction is not a critical transaction, the process returns to step 602. Responsive to determining that a critical transaction is underway, the risk assessment application requests a risk score for an individual (step 606). The request may be a query from queries 353 in FIG. 3. Responsive to receiving a request for a risk score, a cache is accessed (step 608). The cache may be cache 370 in FIG. 3. Responsive to accessing the cache, a risk score for the individual is identified (step 610). The risk score may be from risk scores 373 in FIG. 3. Responsive to identifying the risk score for the individual, the risk assessment application determines whether to grant or deny access to the on-line transaction based on the risk score (step 612). The on-line transaction may be a login transaction 357, registration transaction 358, authentication transaction 359, financial transaction 360, employee benefit transaction 361, or some other human resources transaction 362. A determination is made as to whether there is another transaction (step 614). If there is another transaction, the process returns to step 602. If there is not another transaction, the process ends.

Figure 7A:
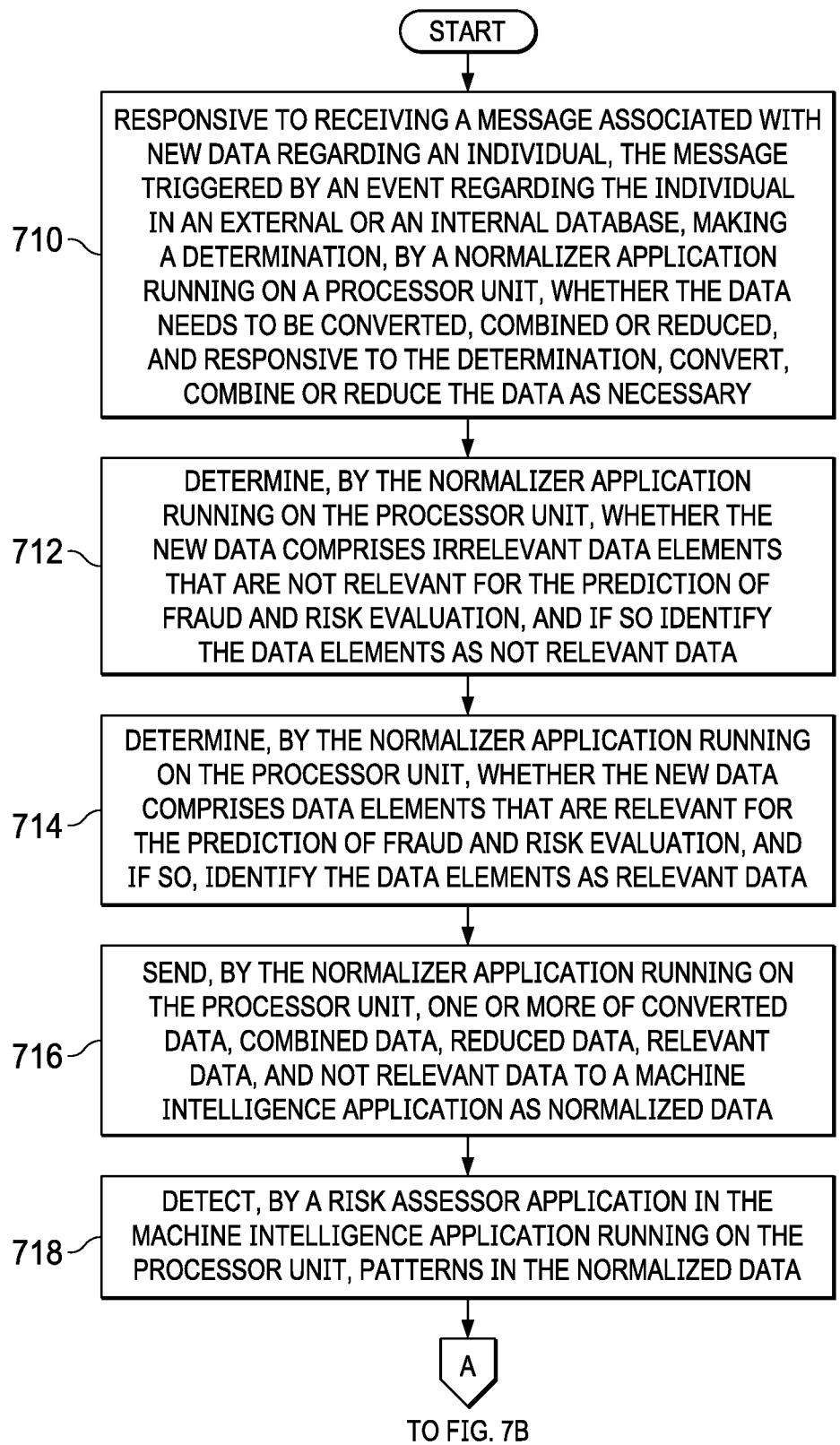
FIGS. 7A-7B are an illustration of a process for computing a risk score for an individual in accordance with an illustrative embodiment.
Figure 7B:
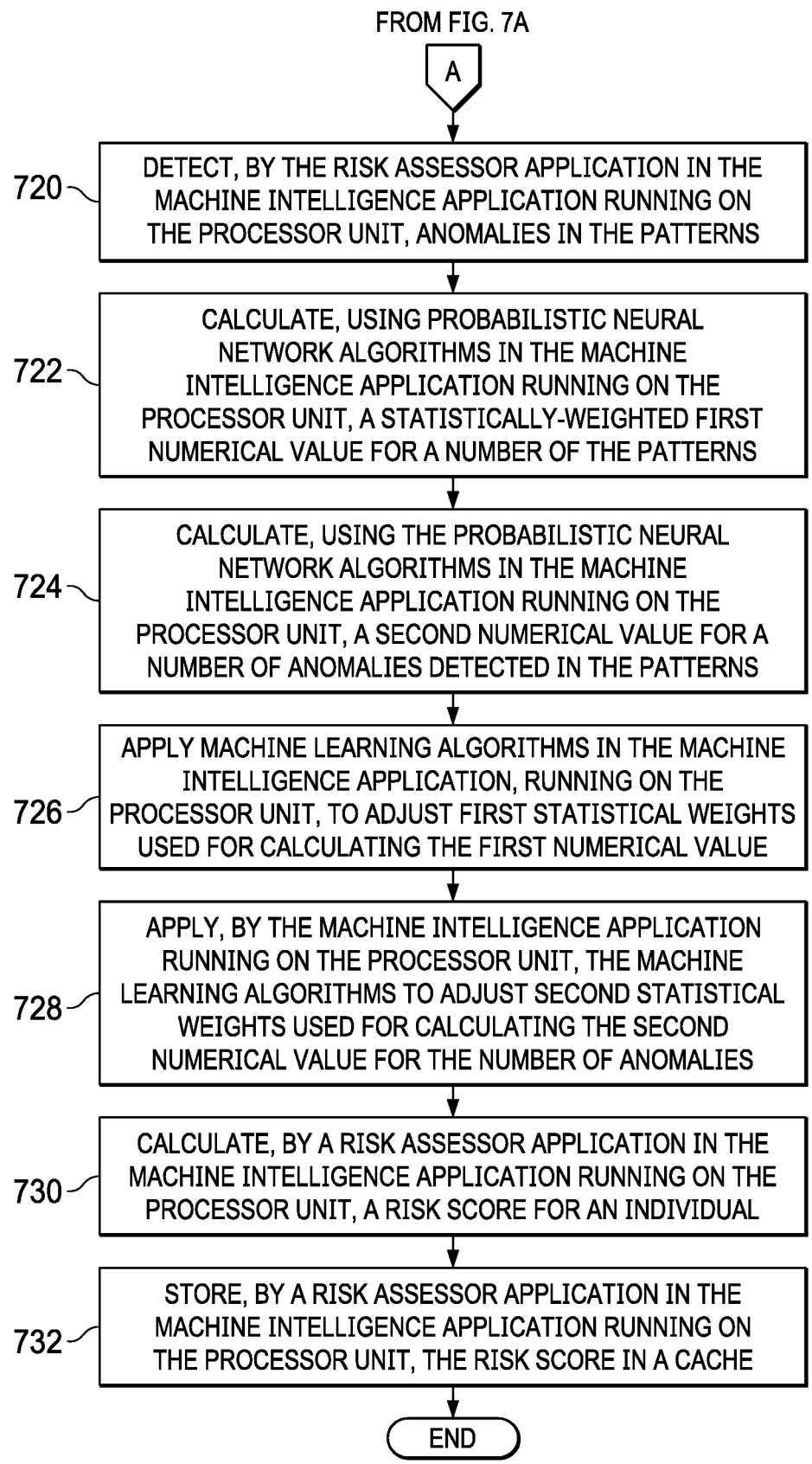

Turning now to FIG. 7A-7B, an illustration of a process for computing a risk score for an individual is depicted in accordance with an illustrative embodiment. Process 700 can be implemented in software, hardware or combination of the two. When software is used, the software comprises program code that can be loaded from a storage device and run by a processor unit in a computer system, such as computer system 300 in FIG. 3. Computer system 300 may reside in a network data processing system, such as network data processing system 100 in FIG. 1. For example, computer system 300 may reside on one or more of server computer 104, server computer 106, client computer 110, client computer 112, or client computer 114 connected by network 102 in FIG. 1.

Process 700 starts. Responsive to receiving a message associated with new data regarding an individual, the message triggered by an event regarding the individual in an external or an internal database, a determination is made, by a normalizer application running on a processor unit, whether the data needs to be converted, combined or reduced, and responsive to the determination, convert, combine or reduce the data as necessary (step 710). The event may be one of transactions 356 in FIG. 3. The message may be one of messages 321 in data ingestion and orchestration framework 320 in FIG. 3. The normalizer application may be normalizer 323 in FIG. 3. A determination is made, by the normalizer application running on the processor unit, whether the new data comprises irrelevant data elements that are not relevant for the prediction of fraud and risk evaluation, and if so identify the data elements as not relevant data (step 712). A determination is made, by the normalizer application running on the processor unit, whether the new data comprises data elements that are relevant for the prediction of fraud and risk evaluation, and if so, identify the data elements as relevant data (step 714). The normalizer application running on the processor unit, sends one or more of converted data, combined data, reduced data, relevant data, and not relevant data to a machine intelligence application (such as machine intelligence application 340 in FIG.

3) as normalized data (step 716). The normalized data may be normalized data 328 in FIG. 3. A risk assessor application in the machine intelligence application running on the processor unit, detects patterns in the normalized data (step 718). The risk assessor application may be risk assessor 343 in machine intelligence application 340 in FIG. 3. The risk assessor application in the machine intelligence application running on the processor unit, detects anomalies in the patterns (step 720). Using probabilistic neural network algorithms, the machine intelligence application running on the processor unit, calculates a statistically-weighted first numerical value for a number of the patterns (step 722). The probabilistic neural network algorithms may be probabilistic neural network algorithms 341 in FIG. 3. The first numerical values may be first numerical values in FIG. 3. Using the probabilistic neural network algorithms, the machine intelligence application running on the processor unit, calculates a second numerical value for a number of anomalies detected in the patterns (step 724). The second numerical values may be second numerical values 349 in FIG. 3. The machine intelligence application running on the processor unit, applies machine learning algorithms to adjust first statistical weights used for calculating the first numerical value (step 726). The machine learning algorithms may be machine learning algorithms 342 in FIG. 3. The first statistical weights may be first statistical weights 350 in FIG. 3. The machine intelligence application running on the processor unit, applies the machine learning algorithms to adjust second statistical weights used for calculating the second numerical value for the number of anomalies (step 728). The second statistical weights may be second statistical weights 351 in FIG. 3. A risk assessor application in the machine intelligence application running on the processor unit, calculates a risk score for an individual (step 730). The risk assessor application in the machine intelligence application running on the processor unit, stores the risk score in a cache (step 732). The process terminates thereafter. The risk score may be one of risk scores 372 in cache 370 in FIG. 3.

Figure 8:
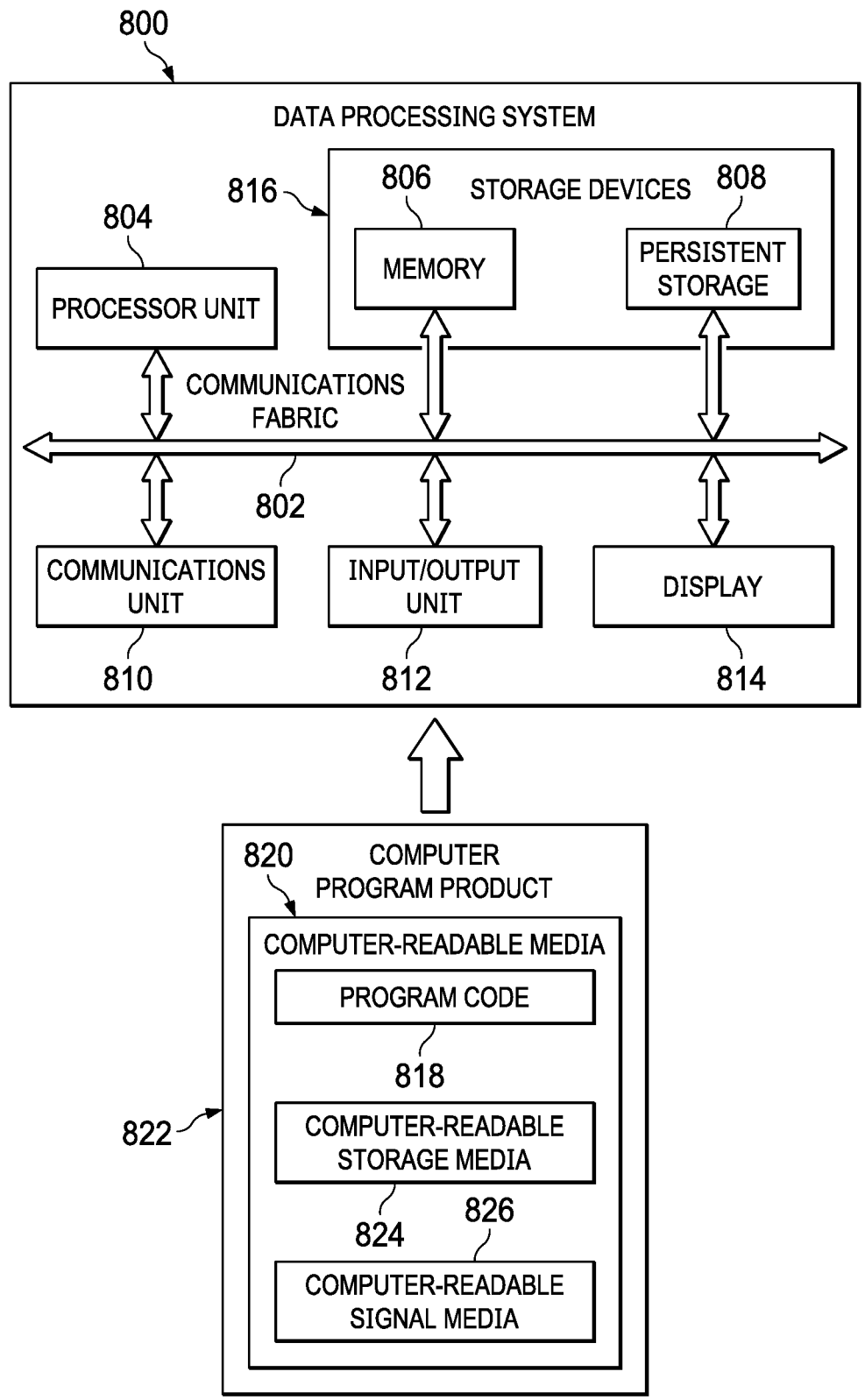
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement one or more computers and computer system 122 in FIG. 1. Data processing system 800 can be used to implemented data processing systems such as server computer 104, server computer 106, client computer 110, client computer 112, client computer 114 and other data processing systems that may be present in network data processing system 100.

In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random-access memory or any other suitable volatile, non-volatile, permanent, or temporary storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the identity intelligence system transforms a computer system into a special purpose computer system as compared to currently available general computer systems that do not have a means to compute a risk score for on-line transactions derived from internal and external sources, such as identity intelligence system 201 of FIG. 2 and as further described in FIGS. 3-6. Currently used general computer systems do not reduce the time or effort needed to assess risk in real time. Further, currently used general computer systems do not provide continuous updating of risk scores by machine intelligence as described in FIGS. 2-6.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method, the computer-implemented method comprising:
   responsive to receiving a message, calculating, by a machine intelligence application running on a processor unit, a risk score for an individual; and
   providing, by the machine intelligence application running on the processor unit, the risk score to a cache;
   wherein the message is triggered by an event regarding the individual in an external database or an internal database and is associated with new data regarding the individual enabling improved risk assessment that results in increased security in processing transactions in a computer system.

2. The computer-implemented method of claim 1, wherein the cache is configured to provide rapid access by a risk application in responding to client computers whose functioning adjusts based on risk score levels.

3. The computer-implemented method of claim 1, further comprising:
   ingesting and processing, by a data ingestion and processing application running on the processor unit, the new data regarding the individual associated with the message; and
   responsive to ingesting and processing the new data regarding the individual, sending the new data to the machine intelligence application.

4. The computer-implemented method of claim 3, further comprising:
   responsive to receiving the new data regarding the individual, calculating, by the machine intelligence application running on the processor unit, a new risk score for the individual; and
   replacing, by the machine intelligence application running on the processor unit, the risk score in the cache with the new risk score.

5. The computer-implemented method of claim 1, further comprising:
   receiving, by a data ingestion and orchestration application running on the processor unit, the new data regarding the individual;
   responsive to receiving the new data regarding the individual, normalizing, by the data ingestion and orchestration application, running on the processor unit, the new data regarding the individual to form a normalized data; and
   responsive to normalizing the new data regarding the individual to form the normalized data, providing, by the data ingestion and orchestration application running on the processor unit, the normalized data to the machine intelligence application.

6. The computer-implemented method of claim 5, wherein normalizing the new data comprises one or more of the following:
   converting, by a normalizer application running on the processor unit, a first portion of the new data to converted data;
   combining, by the normalizer application running on the processor unit, a second portion of the new data to combined data;
   reducing, by the normalizer application running on the processor unit, a third portion of the new data comprising duplicate data elements to form reduced data;
   identifying, by the normalizer application running on the processor unit, a fourth portion of the new data comprising irrelevant data elements that are not relevant for prediction of fraud and risk evaluation to form not relevant data; and
   identifying by the normalizer application running on the processor unit, a fifth portion of the new data comprising data elements that are relevant for prediction of fraud and risk evaluation to form relevant data.

7. The computer-implemented method of claim 1, wherein calculating the risk score, further comprises:
   discovering, by a risk assessor application running on the processor unit, patterns in the new data;
   detecting, by the risk assessor application running on the processor unit, the patterns in the new data; and
   detecting, by the risk assessor application running on the processor unit, anomalies based on the patterns in the data.

8. The computer implemented method of claim 7, wherein calculating the risk score comprises:
   calculating, using probabilistic neural network algorithms running on the processor unit, a statistically-weighted first numerical value for a number of the patterns; and
   calculating, using the probabilistic neural network algorithms running on the processor unit, a second numerical value for a number of anomalies detected in the patterns.

9. The computer implemented method of claim 8, further comprising:
   applying machine learning algorithms, running on the processor unit, to adjust first statistical weights used for calculating a first numerical value; and applying the machine learning algorithms to adjust second statistical weights used for calculating a second numerical value for the number of anomalies.

10. The computer-implemented method of claim 3, wherein the internal data comprises audit data logs, employment and human resource lifecycle changes, individual information data changes, role changes, device registration, financial data, changes in account numbers, changes in credit card numbers or data, employment data including employment status and history, authentication data, transactions, screen navigation, screen visitations, system data, and application logs.

11. The computer-implemented method of claim 4, wherein the external data comprises public records used to validate input data provided by other applications, individual information data, credit history information, social network data and activity, fraud detection service provided data known to be associated with fraud including internet protocol addresses, mobile devices numbers, email addresses, and mailing addresses.

12. A computer system for assigning a risk score to an individual, the computer system comprising:
a processor unit;
a data ingestion and orchestration application running on the processor unit;
internal data sources connected to the data ingestion and orchestration application, the internal data sources configured to send a first message associated with an internal data item, responsive to a first triggering event, to the processor unit;
external data sources connected to the data ingestion and orchestration framework, the external sources configured to send a second message associated with an external data item, responsive to a second triggering event, to the processor unit;
a normalizer, running on the processor unit, to form normalized data from the internal data item and the external data item; and
a machine intelligence application having an algorithm configured to receive the normalized data and to compute the risk score for an individual using the normalized data.

13. The computer system of claim 12, wherein the data ingestion and orchestration application is optimized for rapid data ingestion on a large scale.

14. The computer system of claim 12, further comprising a cache connected to the machine intelligence application and to a risk assessment application, wherein the cache is configured to provide rapid access by a risk application in responding to client computers whose functioning adjusts based on risk score levels.

15. The computer system of claim 14, wherein the risk assessment application responds to incoming queries from any of an authentication application, a registration application, a financial transaction application, an employee benefit application, and other human resource oriented applications.

16. The computer system of claim 14, wherein the risk assessment application is connected via a pluggable mechanism to an identity intelligence system.

17. The computer system of claim 12, wherein the normalizer converts, combines, or reduces duplicate data elements;
wherein the normalizer identifies irrelevant data elements that are not relevant for prediction of fraud and risk evaluation; and
wherein the normalizer identifies data elements that are relevant for prediction of fraud and risk evaluation.

18. The computer system of claim 12, wherein the machine intelligence application computes the risk score by discovering and detecting patterns in the data, and detecting anomalies based on the patterns in the data.

19. The computer system of claim 18, wherein the machine intelligence application further computes the risk score by
calculating, using probabilistic neural network algorithms, a first statistically weighted numerical value for a first number of the patterns and a second statistically weighted numerical value for a second number of anomalies;
wherein the machine intelligence application adjusts statistical weights used for calculating the first numerical value in the probabilistic neural network algorithms, and adjusts weights used for calculating the second numerical value in the probabilistic neural network algorithms; and
wherein the machine intelligence application continually updates the risk score based on new data.

20. A computer program product for real time risk assessment comprising:
a computer-readable storage media storing computer-readable instructions, the computer-readable instructions including:
computer-readable instructions configured to cause a processor to request a risk score for an individual;
computer-readable instructions configured to cause a processor, responsive to receiving a request for a risk score, to access a cache;
computer-readable instructions configured to cause a processor, responsive to accessing the cache, to identify a risk score for the individual; and
computer-readable instructions configured to cause a processor, responsive to identifying the risk score for the individual, determining to determine whether to grant or deny access to an on-line transaction based on the risk score.

* * * * *